United States Patent
Ho et al.

(10) Patent No.: US 7,218,981 B1
(45) Date of Patent: May 15, 2007

(54) DISPATCH INTEGRATION SYSTEM AND METHOD BASED ON SEMICONDUCTOR MANUFACTURING

(75) Inventors: Yu-Wen Ho, Hsinchu (TW); Hung-En Tai, Taipei County (TW); Chien-Chung Chen, Hsinchu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 0 days.

(21) Appl. No.: 11/401,900

(22) Filed: Apr. 12, 2006

(30) Foreign Application Priority Data

Dec. 2, 2005 (TW) .............................. 94142540 A

(51) Int. Cl.
*G06F 19/00* (2006.01)
(52) U.S. Cl. ...................................................... 700/99
(58) Field of Classification Search ................ 700/99, 700/101, 111, 121, 169, 179
See application file for complete search history.

(56) References Cited

U.S. PATENT DOCUMENTS 5,914,879 A * 6/1999 Wang et al. ................ 700/111
2005/0113955 A1 * 5/2005 Chien ......................... 700/101
2005/0256599 A1 * 11/2005 Peng ........................... 700/100

* cited by examiner

*Primary Examiner*—Leo Picard
*Assistant Examiner*—Chad Rapp
(74) *Attorney, Agent, or Firm*—Birch, Stewart, Kolasch & Birch, LLP

(57) ABSTRACT

A dispatch integration method based on semiconductor manufacturing. When multiple tools are idle, idle messages are sent to a real-time dispatch system through a tool control system and a manufacturing execution system. The real-time dispatch system sorts tool parameters relating to tool efficiency based on a currently executed process using a principal component analysis method, defining weights of each tool according to the defined tool parameters and corresponding factor weights using a linear regression weight formula, calculating tool weights of each tool parameter using a linear regression weight formula, and determining a desired tool for dispatch according to the calculated tool weights.

8 Claims, 2 Drawing Sheets

US 7,218,981 B1

DISPATCH INTEGRATION SYSTEM AND METHOD BASED ON SEMICONDUCTOR MANUFACTURING

BACKGROUND OF THE INVENTION

1. Field of the Invention

The present invention relates to management for semiconductor manufacturing, and in particular to a dispatch integration system and method based on semiconductor manufacturing.

2. Description of the Related Art

With respect to semiconductor manufacturing, real-time dispatch systems for factories significantly affect production efficiency. When tools are idle, general dispatch processes are implemented on that on-line operators find appropriate task lists for wafer lots used in a manufacturing execution system (MES) according to tool capacities and limitations, and dispatch orders are determined according to priorities or work experience of on-line operators.

BRIEF SUMMARY OF THE INVENTION

A dispatch integration method based on semiconductor manufacturing is provided. The method is applied to a dispatch integration system comprising a plurality of tools, a tool control system (TCS), a manufacturing execution system (MES), and a real-time dispatch system. Idle messages are sent to a real-time dispatch system through a tool control system and a manufacturing execution system when the tools are idle. The real-time dispatch system sorts tool parameters relating to tool efficiency based on a currently executed process using a principal component analysis (PCA) method, defines factor weights corresponding to each tool parameter according to sorting results, calculates tool weights of each tool according to the defined tool parameters and corresponding factor weights using a linear regression weight formula, and determines a desired tool for dispatching according to the calculated tool weights.

A dispatch integration system based on semiconductor manufacturing is provided. The system comprises a plurality of tools, a tool control system, a manufacturing execution system, and a real-time dispatch system. The tools send idle messages when idle. The tool control system receives and forwards the idle messages from the tools. The manufacturing execution system receives and forwards the idle messages from the tool control system. The real-time dispatch system sorts tool parameters relating to tool efficiency based on a currently executed process using a principal component analysis method when the idle messages are received, defines factor weights corresponding to each tool parameter according to sorting results, calculates tool weights of each tool according to the defined tool parameters and corresponding factor weights using a linear regression weight formula, and determines a desired tool for dispatching according to the calculated tool weights.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
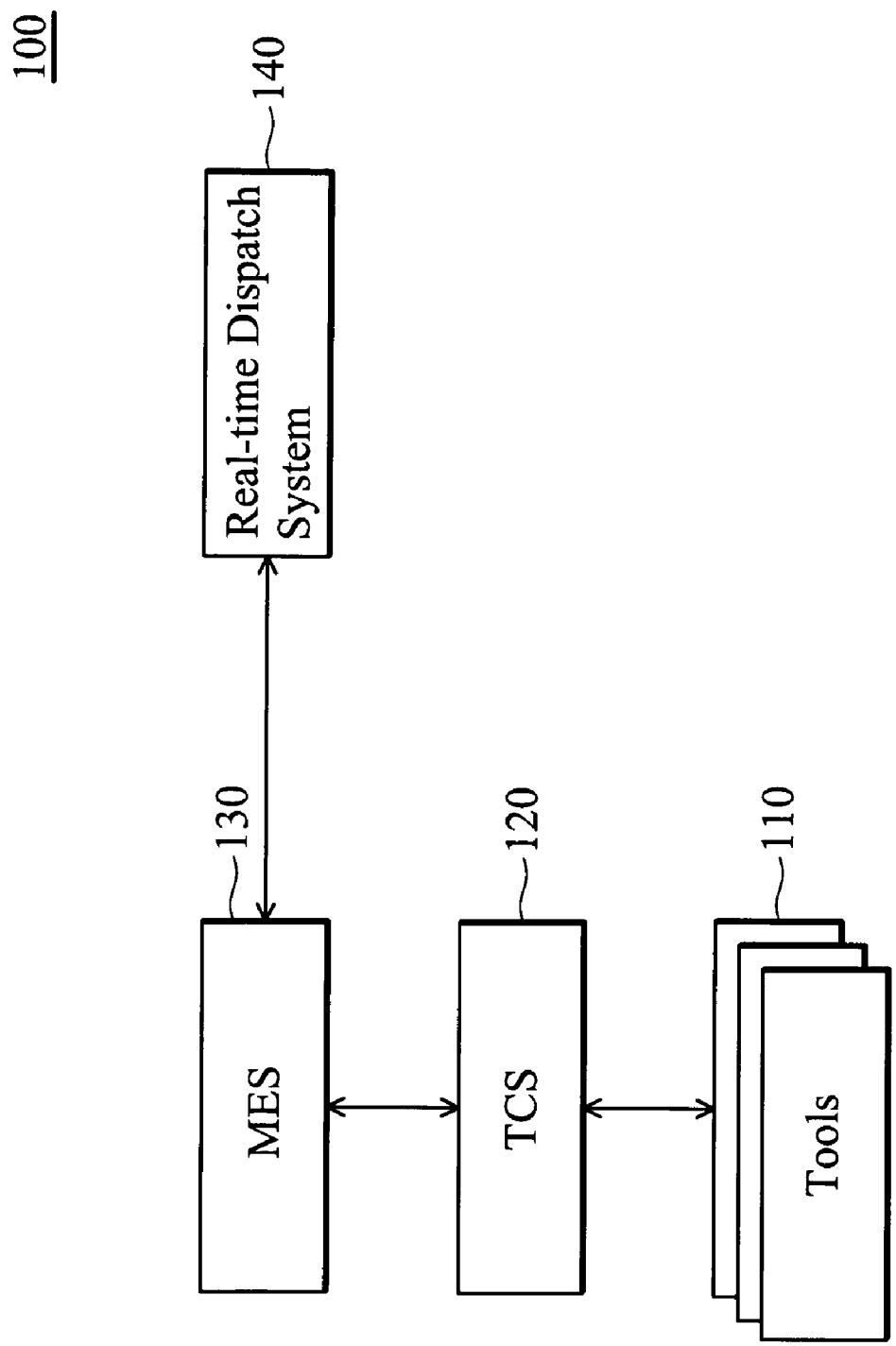
FIG. 1 is a schematic view of an embodiment of a dispatch integration system based on semiconductor manufacturing.

Several exemplary embodiments of the invention are described with reference to FIGS. 1 through 2 and attachments 1 through 17, which generally relate to real-time dispatching. It is to be understood that the following disclosure provides many different embodiments as examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The invention discloses a dispatch integration system and method based on semiconductor manufacturing, applying principal component analysis and linear regression weight to accurately manage tool states and generate dispatch orders according to dispatch indexes, thus promoting production efficiency and yield rate.

FIG. 1 is a schematic view of an embodiment of a dispatch integration system based on semiconductor manufacturing.

Dispatch integration system 100 of an embodiment of the invention comprises a plurality of tools 110, a tool control system (TCS) 120, a manufacturing execution system (MES) 130, and a real-time dispatch system 140. Tools 110 send idle messages, when idle, through TCS 120 to MES 130. MES 130 receives and forwards the idle messages to real-time dispatch system 140. Next, real-time dispatch system 140 receives idle messages and sorts tool parameters (such as temperatures, pressures, gas flow rate, chemical material consistency, and the like) relating to tool efficiency based on a currently executed process using a principal component analysis method, and defines factor weights corresponding to each tool parameter according to sorting results to accurately manage tool states.

Tool parameters comprises angles (AVG.APCAngle), pressures (AVG.APCAngle), gas (RNG.Gas1TiCl4), temperatures (SLP.ShowerHeadPower), and so on, as shown in the first field of the table shown in Attachment 1. Each tool parameter corresponds to multiple factor weights. Six factor weights are described in this embodiment as examples but are not intended to be limitative. When MES 130, for example, is going to execute process A, the table shown in Attachment 1 is generated, in which a tool parameter comprising larger values of corresponding six factor weights significantly affects process A. Values of the six factor weights corresponding to each tool parameter are changed when MES is going to execute process B. Additionally, the table shown in Attachment 1 only displays values of factor weights corresponding to each tool parameter while values of each tool parameter are also changed following different executed processes to react process states at the time.

Next, real-time dispatch system 140 calculates tool weights of each tool according to a "tool parameters-factor weights" table using a linear regression weight formula, represented as:

EQP? $ax_1$? $bx_2$? $cx_3$? . . . ? $sx_{n-1}$? $tx_n$, where EQP represents a tool, $x_1, x_2, \ldots, x_n$ represent tool parameters corresponding to the tool, and a, b, . . . , t represent factor weights corresponding to the tool parameters $x_1 \sim x_n$. As described, each tool parameter corresponds to six factor weights respectively and a maximum one is referred to when weight calculation is implemented. A tool parameter is considered if values of all factor weights corresponding thereto are small. Next, a desired tool for dispatching is determined according to the calculated tool weights. A tool, for example, comprising tool weights larger than a threshold is assigned. Alternatively, a tool for dispatching is determined when tool weights are ordered in front of a predetermined number. Tools, for example, comprising tool weights ordered in front of 5 are determined for dispatch.

Figure 2:
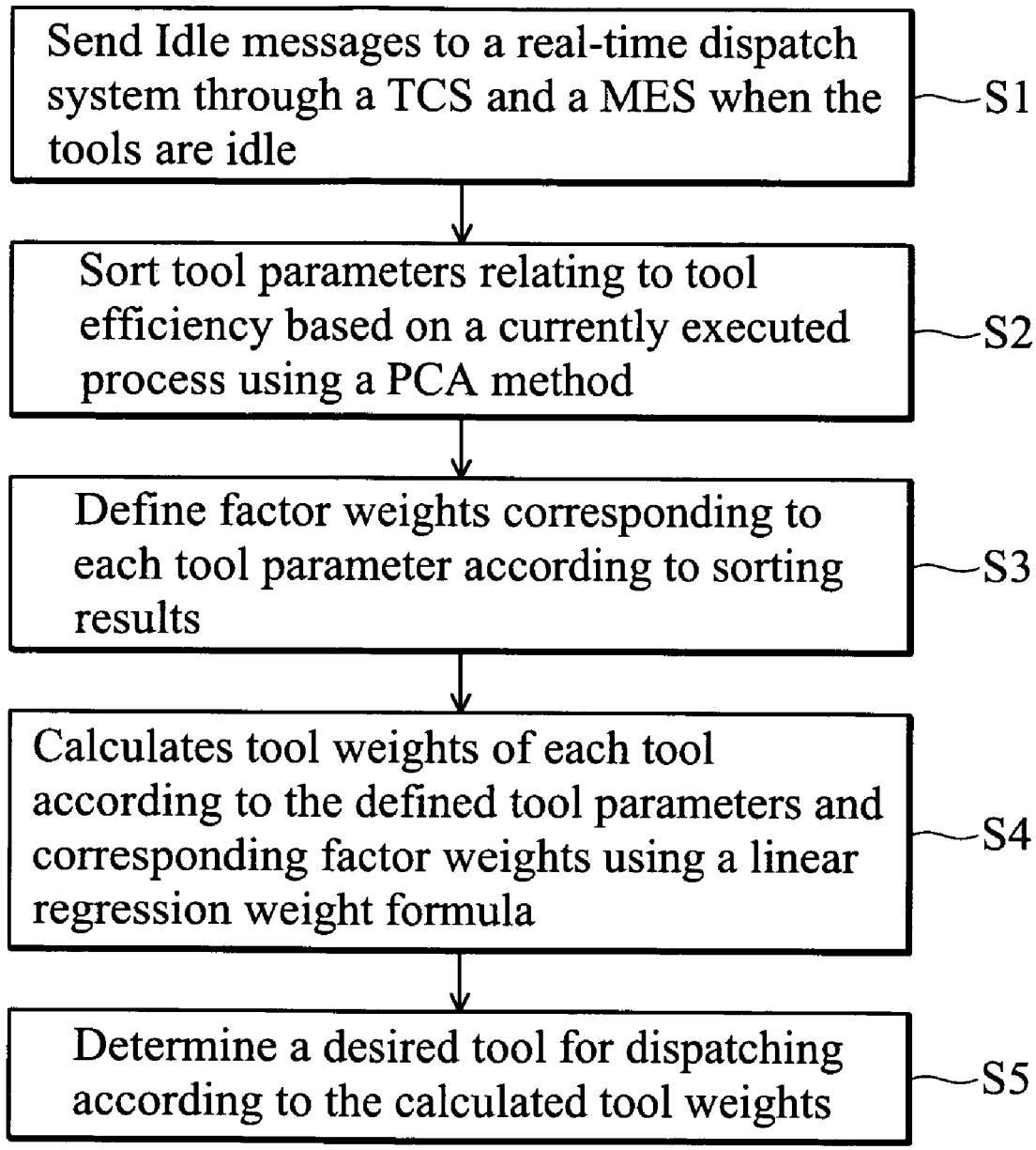
FIG. 2 is a schematic view of an embodiment of a dispatch integration method based on semiconductor manufacturing.

FIG. 2 is a schematic view of an embodiment of a dispatch integration method based on semiconductor manufacturing. The method is applied to a dispatch integration system comprising a plurality of tools, a tool control system, a manufacturing execution system (MES), and a real-time dispatch system.

Idle messages are sent to a real-time dispatch system through a tool control system and a manufacturing execution system when the tools are idle (step S1). The real-time dispatch system sorts tool parameters (such as temperatures, pressures, gas flow rate, chemical material consistency, and the like) relating to tool efficiency based on a currently executed process using a principal component analysis method (step S2), defines factor weights corresponding to each tool parameter according to sorting results (step S3). A tool parameter comprising larger values of corresponding factor weights significantly affects a currently executed process. Additionally, values of each tool parameter are changed following different executed processes to react process states at the time.

Next, the real-time dispatch system calculates tool weights of each tool according to the defined tool parameters and corresponding factor weights using a linear regression weight formula (step S4), represented as:

EQP? $ax_1$? $bx_2$? $cx_3$? ... ? $sx_{n-1}$? $tx_n$, where EQP represents a tool, $x_1, x_2, \ldots, x_n$ represent tool parameters corresponding to the tool, and a, b, ..., t represent factor weights corresponding to the tool parameters $x_1 \sim x_n$. The real-time dispatch system determines a desired tool for dispatching according to the calculated tool weights (step S5). As described, each tool parameter corresponds to six factor weights respectively and a maximum one is referred to when weight calculation is implemented. A tool parameter is considered if values of all factor weights corresponding thereto are small. Next, a desired tool is determined for dispatch according to the calculated tool weights. A tool, for example, comprising tool weights larger than a threshold is assigned. Alternatively, a tool for dispatch is determined when tool weights are ordered in front of a predetermined number. Tools, for example, comprising tool weights ordered in front of 5 are determined for dispatch.

An example of a dispatch integration method of the invention is illustrated in the following.

Referring to FIG. 1, as described, the real-time dispatch system sorts tool parameters relating to tool efficiency based on a currently executed process using a principal component analysis method and defines factor weights corresponding to each tool parameter according to sorting results. Tool parameters are shown in the first field of the table shown in Attachment 1 and each corresponds to six factor weights (Factor 1~Factor 6) respectively. The real-time dispatch system must select tool parameters significantly affecting the currently executed process according to factor weights to calculate tool weights of each tool using a linear regression weight formula. As shown in Attachment 1, weights recorded in a field marked by yellow significantly affect a currently executed process, such that tool parameters corresponding to those factor weights are selected to be substituted for the linear regression weight formula to obtain weights of a tool.

Attachments 2~18 show relations between factor weights or tool parameters. Attachments 2~5 show relations between a first factor weight corresponding to a tool parameter and a second factor weight to a fifth factor weight corresponding to the tool parameter. Attachments 6~8 show relations between a second factor weight corresponding to a tool parameter and a third factor weight to a fifth factor weight corresponding to the tool parameter. Attachment 9 shows relations between a third factor weight and a fourth factor weight corresponding to the tool parameter. Attachment 10 shows relations between three different tool parameters, in which the X axis represents the ARA.RFTunePosition parameter, the Y axis represents the ARA.RFVdc parameter, and the Z axis represents the ARA.RFVpp parameter. Attachment 11 shows relations between the ARA.RFTunePosition parameter, the ARA.RFVdc parameter, and the ARA.RFVpp parameter when the manufacturing state for a wafer lot is good (State: Goodlot) or bad (State: NGlot).

Attachment 12 shows relations between three different tool parameters, in which the X axis represents the ARA.RFTunePosition parameter, the Y axis represents the ARA.RFVdc parameter, and the Z axis represents the ARA.ShowerHeadTemp parameter. Attachment 13 shows relations between the ARA.RFTunePosition parameter, the ARA.RFVdc parameter, and the ARA.ShowerHeadTemp parameter when the manufacturing state for a wafer lot is good (State: Goodlot) or bad (State: NGlot).

Attachment 14 shows relations between three different tool parameters, in which the X axis represents the ARA.RFVdc parameter, the Y axis represents the ARA.RFVpp parameter, and the Z axis represents the ARA.ShowerHeadTemp parameter. Attachment 15 shows relations between the ARA.RFVdc parameter, the ARA.RFVpp parameter, and the ARA.ShowerHeadTemp parameter when the manufacturing state for a wafer lot is good (State: Goodlot) or bad (State: NGlot).

Attachment 16 shows relations between three different tool parameters, in which the X axis represents the ARA.RFTunePosition parameter, the Y axis represents the ARA.RFVpp parameter, and the Z axis represents the ARA.ShowerHeadTemp parameter. Attachment 17 shows relations between the ARA.RFTunePosition parameter, the ARA.RFVpp parameter, and the ARA.ShowerHeadTemp parameter when the manufacturing state for a wafer lot is good (State: Goodlot) or bad (State: NGlot).

As described, each tool weight can be accurately calculated according to the relations between tool parameters and corresponding factor weights to more accurately manage tool states.

A dispatch integration method based on semiconductor manufacturing of the invention applies a principal component analysis method to sort tool parameters and group significant factors and defines factor weights to accurately manage tool states. Further, linear regression weight calculation is implemented to quantify tool awaiting states and tool efficiency factors and other factors as optimum dispatching indexes to generate dispatching orders. Additionally, the dispatch integration of the invention can be programmed as a recognition engine to be integrated with an automated dispatch system.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dispatch integration method based on semiconductor manufacturing, applied to a dispatch integration system comprising a plurality of tools, a tool control system, a manufacturing execution system (MES), and a real-time dispatch system, the method comprising:

sending idle messages to a real-time dispatch system through a tool control system and a manufacturing execution system when the tools are idle;

sorting tool parameters relating to tool efficiency, by the real-time dispatch system, based on a currently executed process using a principal component analysis method;

defining factor weights corresponding to each tool parameter, by the real-time dispatch system, according to sorting results;

calculating tool weights of each tool, by the real-time dispatch system, according to the defined tool parameters and corresponding factor weights using a linear regression weight formula; and determining a desired tool for dispatching, by the real-time dispatch system, according to the calculated tool weights.

2. The dispatch integration method as claimed in claim 1, wherein the linear regression weight formula is represented as:

EQP? $ax_1$? $bx_2$? $cx_3$? . . . ? $sx_{n-1}$? $tx_n$, where EQP represents a tool, $x_1, x_2, x_n$ represent tool parameters corresponding to the tool, and a, b, . . . , t represent factor weights corresponding to the tool parameters $x_1 \sim x_n$.

3. The dispatch integration method as claimed in claim 1, wherein each tool parameter corresponds to multiple factor weights, wherein a tool parameter corresponding to larger factor weights more seriously affects the executed process.

4. The dispatch integration method as claimed in claim 3, wherein each tool parameter and corresponding factor weights are changed following different executed processes.

5. A dispatch integration system based on semiconductor manufacturing, comprising:

a plurality of tools, capable of sending idle messages when idle;

a tool control system, coupled to the tools, capable of receiving and forwarding the idle messages from the tools;

a manufacturing execution system, coupled to the tool control system, capable of receiving and forwarding the idle messages from the tool control system; and a real-time dispatch system, coupled to the manufacturing execution system, capable of sorting tool parameters relating to tool efficiency based on a currently executed process using a principal component analysis method when the idle messages are received, defining factor weights corresponding to each tool parameter according to sorting results, calculating tool weights of each tool according to the defined tool parameters and corresponding factor weights using a linear regression weight formula, and determining a desired tool for dispatch according to the calculated tool weights.

6. The dispatch integration system as claimed in claim 5, wherein the linear regression weight formula is represented as:

EQP? $ax_1$? $bx_2$? $cx_3$? . . . ? $sx_{n-1}$? $tx_n$, where EQP represents a tool, $x_1, x_2, x_n$ represent tool parameters corresponding to the tool, and a, b, . . . , t represent factor weights corresponding to the tool parameters $x_1 \sim x_n$.

7. The dispatch integration system as claimed in claim 5, wherein each tool parameter corresponds to multiple factor weights, wherein a tool parameter corresponding to larger factor weights more seriously affects the executed process.

8. The dispatch integration system as claimed in claim 7, wherein each tool parameter and corresponding factor weights are changed following different executed processes.

* * * * *